United States Patent
Liu et al.

(10) Patent No.: US 9,251,823 B1
(45) Date of Patent: Feb. 2, 2016

(54) DATA STORAGE DEVICE DELAYING SEEK OPERATION TO AVOID THERMAL ASPERITIES

(71) Applicant: Western Digital Technologies, Inc., Irvine, CA (US)

(72) Inventors: Kexiu Liu, Foothill Ranch, CA (US); Orhan Beker, Dove Canyon, CA (US); Kenneth T. Tabacchi, Irvine, CA (US); Chun Sei Tsai, Tustin, CA (US); Carl E. Barlow, Lake Forest, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/565,635

(22) Filed: Dec. 10, 2014

(51) Int. Cl.
*G11B 21/02* (2006.01)
*G11B 5/55* (2006.01)

(52) U.S. Cl.
CPC .................................. *G11B 5/5547* (2013.01)

(58) Field of Classification Search
None
See application file for complete search history.

(56) References Cited

U.S. PATENT DOCUMENTS

| | | | |
|---|---|---|---|
| 6,014,283 A | 1/2000 | Codilian et al. |
| 6,052,076 A | 4/2000 | Patton, III et al. |
| 6,052,250 A | 4/2000 | Golowka et al. |
| 6,067,206 A | 5/2000 | Hull et al. |
| 6,078,453 A | 6/2000 | Dziallo et al. |
| 6,091,564 A | 7/2000 | Codilian et al. |
| 6,094,020 A | 7/2000 | Goretzki et al. |
| 6,101,065 A | 8/2000 | Alfred et al. |
| 6,104,153 A | 8/2000 | Codilian et al. |
| 6,122,133 A | 9/2000 | Nazarian et al. |
| 6,122,135 A | 9/2000 | Stich |
| 6,141,175 A | 10/2000 | Nazarian et al. |
| 6,160,368 A | 12/2000 | Plutowski |
| 6,181,502 B1 | 1/2001 | Hussein et al. |
| 6,195,222 B1 | 2/2001 | Heminger et al. |
| 6,198,584 B1 | 3/2001 | Codilian et al. |
| 6,198,590 B1 | 3/2001 | Codilian et al. |
| 6,204,988 B1 | 3/2001 | Codilian et al. |
| 6,243,223 B1 | 6/2001 | Elliott et al. |
| 6,281,652 B1 | 8/2001 | Ryan et al. |
| 6,285,521 B1 | 9/2001 | Hussein |
| 6,292,320 B1 | 9/2001 | Mason et al. |
| 6,310,742 B1 | 10/2001 | Nazarian et al. |
| 6,320,718 B1 | 11/2001 | Bouwkamp et al. |
| 6,342,984 B1 | 1/2002 | Hussein et al. |
| 6,347,018 B1 | 2/2002 | Kadlec et al. |
| 6,369,972 B1 | 4/2002 | Codilian et al. |
| 6,369,974 B1 | 4/2002 | Asgari et al. |
| 6,462,896 B1 | 10/2002 | Codilian et al. |
| 6,476,996 B1 | 11/2002 | Ryan |
| 6,484,577 B1 | 11/2002 | Bennett |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |

(Continued)

*Primary Examiner* — K. Wong

(57) ABSTRACT

A data storage device is disclosed comprising a head actuated over a disk comprising a plurality of tracks, wherein at least two of the tracks comprise a thermal asperity. Prior to seeking the head from a first track to a second track, for each of at least two of the thermal asperities a minimum seek delay and a maximum seek delay that will cause the head to miss the thermal asperity are computed, and an allowed seek delay range that will cause the head to miss the thermal asperity is computed. When the undelayed seek will cause the head to hit at least one thermal asperity, the seek is delayed by a seek delay determined based on the minimum seek delays, the maximum seek delays, and the allowed seek delay ranges.

12 Claims, 3 Drawing Sheets

(56) References Cited

U.S. PATENT DOCUMENTS

| | | | |
|---|---|---|---|
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,552,880 B1 | 4/2003 | Dunbar et al. |
| 6,560,056 B1 | 5/2003 | Ryan |
| 6,567,229 B1 | 5/2003 | Mallary et al. |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,937,430 B2 * | 8/2005 | Ge et al. ............... 360/78.06 |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,154,696 B2 | 12/2006 | Nikitin et al. |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,382,565 B2 | 6/2008 | Khurshudov et al. |
| 7,388,728 B1 | 6/2008 | Chen et al. |
| 7,391,583 B1 | 6/2008 | Sheh et al. |
| 7,391,584 B1 | 6/2008 | Sheh et al. |
| 7,433,143 B1 | 10/2008 | Ying et al. |
| 7,436,614 B2 * | 10/2008 | Uchida ............... 360/64 |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,069 B2 * | 11/2008 | Yoshioka et al. ............... 360/75 |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |

(56) References Cited

U.S. PATENT DOCUMENTS

| | | |
|---|---|---|
| 7,505,223 B1 | 3/2009 | McCornack |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,804,661 B2 | 9/2010 | Wilcox et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,894,162 B2 | 2/2011 | Mahdev et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,031,421 B2 * | 10/2011 | Shitara et al. .................. 360/31 |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,694,841 B1 * | 4/2014 | Chung et al. .................. 714/723 |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |
| 8,780,477 B1 | 7/2014 | Guo et al. |
| 8,780,479 B1 | 7/2014 | Helmick et al. |
| 8,780,489 B1 | 7/2014 | Gayaka et al. |
| 8,792,202 B1 | 7/2014 | Wan et al. |
| 8,797,664 B1 | 8/2014 | Guo et al. |
| 8,804,267 B2 | 8/2014 | Huang et al. |
| 8,824,081 B1 | 9/2014 | Guo et al. |
| 8,824,262 B1 | 9/2014 | Liu et al. |
| 2010/0035085 A1 | 2/2010 | Jung et al. |
| 2012/0284493 A1 | 11/2012 | Lou et al. |
| 2013/0120870 A1 | 5/2013 | Zhou et al. |
| 2013/0148240 A1 | 6/2013 | Ferris et al. |

* cited by examiner

FIG. 3A
FIG. 3B
HIT CASE
FIG. 4A
FIG. 4B
MISS CASE

US 9,251,823 B1

DATA STORAGE DEVICE DELAYING SEEK OPERATION TO AVOID THERMAL ASPERITIES

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIGS. 3A and 3B illustrate cases where the head may hit a thermal asperity during a seek according to an embodiment.

FIGS. 4A and 4B illustrate cases where the head may avoid a thermal asperity during a seek according to an embodiment.

DETAILED DESCRIPTION

Figure 1:
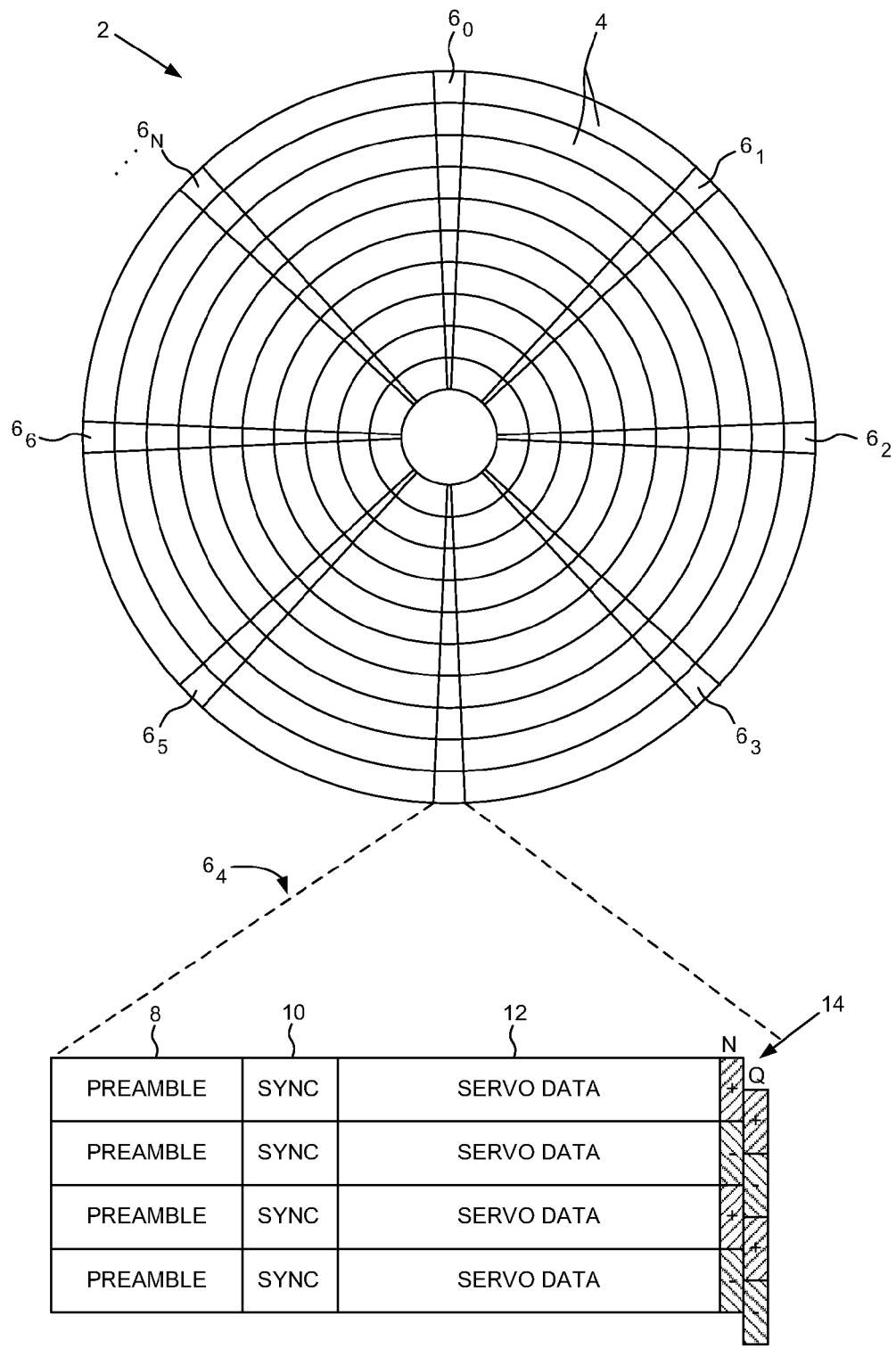
FIG. 1 shows a prior art disk format comprising a plurality of servo tracks defined by servo sectors.
Figure 2A:
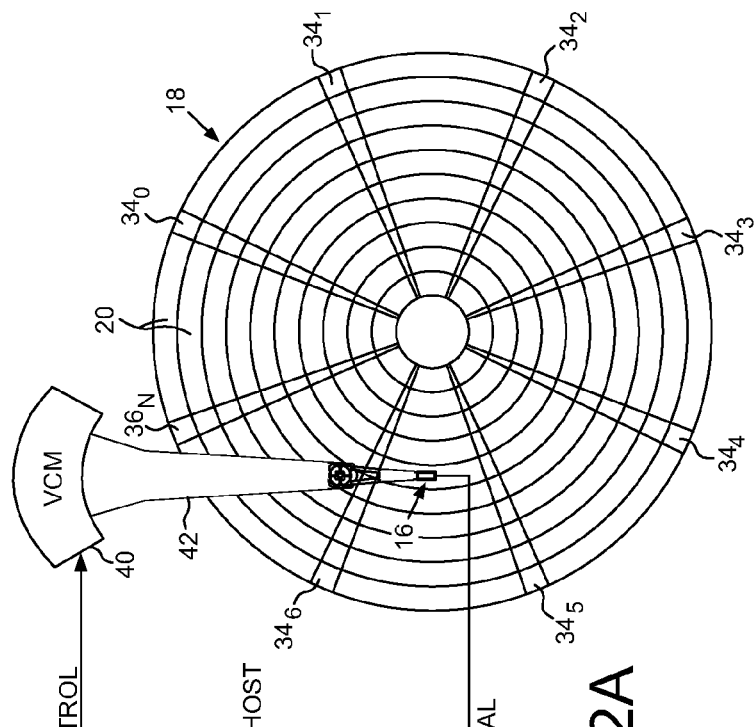
FIG. 2A shows a data storage device in the form of a disk drive according to an embodiment comprising a head actuated over a disk comprising a plurality of tracks, wherein at least two of the tracks comprise a thermal asperity.
Figure 2B:
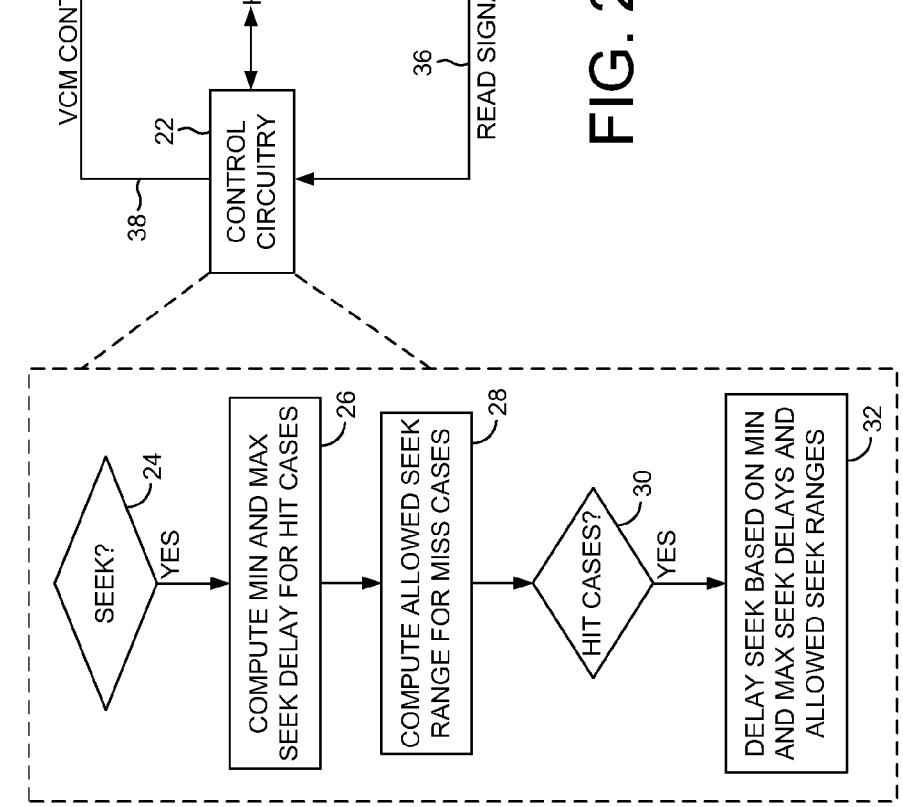
FIG. 2B is a flow diagram according to an embodiment wherein a seek is delayed in order to avoid the thermal asperities during the seek.

FIG. 2A shows a data storage device in the form of a disk drive according to an embodiment comprising a head 16 actuated over a disk 18 comprising a plurality of tracks 20, wherein at least two of the tracks 20 comprise a thermal asperity. The disk drive further comprises control circuitry 22 configured to execute the flow diagram of FIG. 2B, wherein prior to seeking the head from a first track to a second track (block 24), for each of at least two of the thermal asperities a minimum seek delay and a maximum seek delay that will cause the head to miss the thermal asperity are computed (block 26), and an allowed seek delay range that will cause the head to miss the thermal asperity is computed (block 28). When the undelayed seek will cause the head to hit at least one thermal asperity (block 30), the seek is delayed by a seek delay determined based on the minimum seek delays, the maximum seek delays, and the allowed seek delay ranges (block 32).

In the embodiment of FIG. 2A, servo sectors $34_0$-$34_N$ define a plurality of servo tracks 20, wherein data tracks are defined relative to the servo tracks at the same or different radial density. In an embodiment where the servo sectors $34_0$-$34_N$ are recorded at the same data rate, the servo sectors $34_0$-$34_N$ form servo wedges that extend radially across the disk 18 as shown in FIG. 2A. Other embodiments may employ zoned servo sectors wherein the data rate may vary across the radius of the disk, thereby forming servo wedges within each servo zone. The control circuitry 22 processes a read signal 36 emanating from the head 16 to demodulate the servo sectors $34_0$-$34_N$ and generate a position error signal (PES) representing an error between the actual position of the head and a target position relative to a target track. The control circuitry 22 filters the PES using a suitable compensation filter to generate a control signal 38 applied to a voice coil motor (VCM) 40 which rotates an actuator arm 42 about a pivot in order to actuate the head 16 radially over the disk 18 in a direction that reduces the PES. The servo sectors $34_0$-$34_N$ may comprise any suitable head position information, such as a track address for coarse positioning and servo bursts for fine positioning. The servo bursts may comprise any suitable pattern, such as an amplitude based servo pattern or a phase based servo pattern.

In one embodiment, at least two of the tracks 20 comprise a thermal asperity which may comprise a raised area of the disk surface due to a defect in manufacturing the disk, a contaminant on the disk, or any other aberration that may cause an asperity on the disk surface. In one embodiment, it may be desirable to prevent the head 16 from hitting a thermal asperities since the collision may damage one or more elements of the head, or induce a disturbance in the servo control system, or cause any other undesirable effect. According, in one embodiment prior to seeking the head 16 across the disk surface from a first track to a second track based on a normally computed seek (i.e., an undelayed seek), the control circuitry 22 determines whether the undelayed seek will cause the head to hit at least one of the thermal asperities during the seek. If so, in one embodiment the control circuitry 22 computes a seek delay for the seek which will cause the head to miss at least one of the thermal asperities during the seek.

Assuming the head is at servo wedge $w_0$ at the beginning of a seek operation, and assuming it will take time $t_i$ in servo wedges for the head to reach one of the tracks comprising a thermal asperity $TA_i$, then the wedge number $w_i$ when the head reaches the track may be computed as:

$$w_i = \mathrm{mod}(t_i + w_0, \mathrm{Rev})$$

where Rev represents a total number of servo wedges in the track comprising the thermal asperity. Any suitable technique may be employed to compute the time $t_i$ in servo wedges that it will take the head to reach a servo track having thermal asperity $TA_i$, wherein in one embodiment the time $t_i$ may be computed based on the seek profile employed for the seek, which in one embodiment may depend on the seek length. FIGS. 3A and 3B illustrate cases where the head will hit thermal asperity $TA_i$ if the above wedge number $w_i$ falls within a range of wedges impacted by the thermal asperity. FIG. 3A illustrates a case where the thermal asperity $TA_i$ occurs in the middle of a track, and FIG. 3B illustrates a case where the thermal asperity $TA_i$ wraps around from the end of the track (last servo wedge number) to the beginning of the track (first servo wedge number). FIGS. 4A and 4B illustrate cases where the head will miss thermal asperity $TA_i$ if the above wedge number $w_i$ falls outside the range of wedges impacted by the thermal asperity $TA_i$.

In one embodiment, prior to executing a seek operation the control circuitry 22 computes the above wedge number $w_i$ for each servo track comprising a thermal asperity, and if the head will hit one or more of the thermal asperities (i.e., if the wedge number $w_i$ falls within the range of wedges impacted by each thermal asperity), then the control circuitry 22 computes a seek delay to delay the seek so that the head will miss the thermal asperities during the seek. In one embodiment, the control circuitry 22 computes the seek delay as a minimum seek delay that will cause the head to miss the thermal asperities during the seek.

In one embodiment, when an undelayed seek will cause the head to hit a thermal asperity, the control circuitry 22 computes a minimum seek delay and a maximum seek delay that will cause the head to miss the thermal asperity according to:

$$\begin{cases} t_{min,i} = w_{i1} - w_i, t_{max,i} = Rev + w_{i0} - w_i, \text{ if } w_{i0} \le w_{i1} \\ t_{min,i} = Rev + w_{i1} - w_i, t_{max,i} = Rev + w_{i0} - w_i, \text{ if } w_{i0} > w_{i1}, w_i > w_{i0} \\ t_{min,i} = w_{i1} - w_i, t_{max,i} = w_{i0} - w_i, \text{ if } w_{i0} > w_{i1}, w_i < w_{i1} \end{cases}$$

where i represents an index for the thermal asperity, $t_{min,i}$ represents the minimum seek delay, $t_{max,i}$ represents the maximum seek delay, $w_i$ represents a servo wedge in the thermal asperity where the head will hit the thermal asperity during the undelayed seek, $w_{i0}$ and $w_{i1}$ represent servo wedges that define a boundary of the thermal asperity (e.g., FIGS. 3A and 3B), and Rev represents a total number of servo wedges in the track comprising the thermal asperity. In one embodiment, when the undelayed seek will cause the head to miss the thermal asperity, the control circuitry 22 is configured to compute an allowed seek delay range that will cause the head to miss the thermal asperity according to:

$$\begin{cases} t_{minNot,i} = w_{i0} - w_i - 1, t_{maxNot,i} = w_{i1} - w_i + 1, \text{ if } w_{i0} \le w_{i1}, w_i < w_{i0} \\ t_{minNot,i} = Rev + w_{i0} - w_i - 1, t_{maxNot,i} = \\ \quad Rev + w_{i1} - w_i + 1, \text{ if } w_{i0} \le w_{i1}, w_i > w_{i1} \\ t_{minNot,i} = w_{i0} - w_i - 1, t_{maxNot,i} = w_{i1} - w_i + 1, \text{ if } w_{i0} > w_{i1} \end{cases}$$

where i represents an index for the thermal asperity, and $t_d$ represents the allowed seek delay range. In one embodiment, after computing the above minimum seek delay and maximum seek delay that will cause the head to miss each "hit" thermal asperity, and after computing the allowed seek delay that will cause the head to still avoid each "miss" thermal asperity, the control circuitry 22 is configured to compute the seek delay by:

(1) for all cases where the head will hit the thermal asperities compute an acceptable delay range according to:

$$t_{min} = \max_i t_{min,i} + 1, t_{max} = \min_i t_{max,i} - 1$$

(2) if $t_{min} \le t_{minNot,i}$ for all cases where the head will miss the thermal asperities then the seek delay is set equal to $t_{min}$, otherwise for each case where the head will miss the thermal asperities if $t_{min} > t_{minNot,i}$ then $t_{min} = t_{max\ Not,i}$.

In one embodiment, the above second step is executed for each "miss" case (after removing the current "miss" case from the list) until all of the "miss" cases have been processed. In one embodiment if the control circuitry 22 detects only "hit" cases, then the seek delay is set equal to the $t_{min}$ initialized in the above first step (i.e., it is not necessary to execute the above second step). In one embodiment if during the above second step $t_{min} > t_{minNot,i}$ for a miss case and $t_{max} < t_{maxNot,i}$, then it is not possible to avoid the thermal asperity by delaying the seek based on the above algorithm, and therefore another suitable action may be taken such as raising the fly height of the head during at least part of the seek.

In one embodiment, the control circuitry 22 may execute a rotational position optimization (RPO) algorithm in which a plurality of access commands are stored in a command queue and then selected for execution based on an order that improves the performance of the disk drive. For example, the RPO algorithm may select the access commands based on an order that minimizes the execution time to complete the access commands, thereby maximizing the throughput of the disk drive. In one embodiment, the control circuitry 22 may compute the seek delay ranges for at least two access commands in the command queue that will cause the head to miss the thermal asperities as described above. The seek delay ranges for the access commands may then be taken into account in the RPO algorithm in addition to other access latency parameters, such as the seek delay and rotational delay required for each access command. In one embodiment, the RPO algorithm may select a non-minimum seek delay for one or more of the access commands when determining the execution order. That is, the optimal execution order as determined by the RPO algorithm may result in a non-minimum seek delay being assigned to one or more of the access commands in the command queue.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk comprising a plurality of tracks, wherein at least two of the tracks comprise a thermal asperity;
   a head actuated over the disk; and
   control circuitry configured to seek the head from a first track to a second track by at least:
   for each of at least two of the thermal asperities:
   when an undelayed seek will cause the head to hit the thermal asperity, computing a minimum seek delay and a maximum seek delay that will cause the head to miss the thermal asperity; and
   when the undelayed seek will cause the head to miss the thermal asperity, computing an allowed seek delay range that will cause the head to miss the thermal asperity; and
   when the undelayed seek will cause the head to hit at least one of the thermal asperities, delaying the seek by a seek delay determined based on the minimum seek delays, the maximum seek delays, and the allowed seek delay ranges.

2. The data storage device as recited in claim 1, wherein the seek delay comprises a minimum seek delay determined based on the minimum seek delays, the maximum seek delays, and the allowed seek delay ranges.

3. The data storage device as recited in claim 2, wherein for one of the thermal asperities the control circuitry is further configured to compute the minimum seek delay and the maximum seek delay according to:

$$\begin{cases} t_{min,i} = w_{i1} - w_i, t_{max,i} = Rev + w_{i0} - w_i, \text{ if } w_{i0} \leq w_{i1} \\ t_{min,i} = Rev + w_{i1} - w_i, t_{max,i} = Rev + w_{i0} - w_i, \text{ if } w_{i0} > w_{i1}, w_i > w_{i0} \\ t_{min,i} = w_{i1} - w_i, t_{max,i} = w_{i0} - w_i, \text{ if } w_{i0} > w_{i1}, w_i < w_{i1} \end{cases}$$

i represents an index for the thermal asperity;
$t_{min,i}$ represents the minimum seek delay;
$t_{max,i}$ represents the maximum seek delay;
$w_i$ represents a servo wedge in the thermal asperity where the head will hit the thermal asperity during the undelayed seek;
$w_{i0}$ and $w_{i1}$ represent servo wedges that define a boundary of the thermal asperity; and
Rev represents a total number of servo wedges in the track comprising the thermal asperity.

4. The data storage device as recited in claim 3, wherein for one of the thermal asperities the control circuitry is further configured to compute the allowed seek delay range according to:

$t_d \in [0, t_{minNot,i}] \cup [t_{maxNot,i}, Rev-1]$ where $$\begin{cases} t_{minNot,i} = w_{i0} - w_i - 1, t_{maxNot,i} = w_{i1} - w_i + 1, \text{ if } w_{i0} \leq w_{i1}, w_i < w_{i0} \\ t_{minNot,i} = Rev + w_{i0} - w_i - 1, t_{maxNot,i} = \\ \quad Rev + w_{i1} - w_i + 1, \text{ if } w_{i0} \leq w_{i1}, w_i > w_{i1} \\ t_{minNot,i} = w_{i0} - w_i - 1, t_{maxNot,i} = w_{i1} - w_i + 1, \text{ if } w_{i0} > w_{i1} \end{cases}$$

where:
i represents an index for the thermal asperity; and
$t_d$ represents the allowed seek delay range.

5. The data storage device as recited in claim 3, wherein the control circuitry is further configured to compute the seek delay by:
   for all cases where the head will hit the thermal asperities computing an acceptable delay range according to:
   $t_{min} = \max_i t_{min,i} + 1, t_{max} = \min_i t_{max,i} - 1$
   if $t_{min} \leq t_{minNot,i}$ for all cases where the head will miss the thermal asperities then setting the seek delay equal to $t_{min}$, otherwise for each case where the head will miss the thermal asperities if $t_{min} > t_{minNot,i}$ then $t_{min} = t_{maxNot,i}$.

6. The data storage device as recited in claim 1, wherein the control circuitry is further configured to:
   store a plurality of access commands in a command queue; and
   execute a rotational position optimization (RPO) algorithm to determine an execution order for the access commands based on the seek delay determined for at least two of the access commands.

7. A method of operating a data storage device, the method comprising:
   seeking a head over a disk from a first track to a second track by at least:
   for each of at least two of a plurality of thermal asperities on the disk:
   when an undelayed seek will cause the head to hit the thermal asperity, computing a minimum seek delay and a maximum seek delay that will cause the head to miss the thermal asperity; and
   when the undelayed seek will cause the head to miss the thermal asperity, computing an allowed seek delay range that will cause the head to miss the thermal asperity; and
   when the undelayed seek will cause the head to hit at least one of the thermal asperities, delaying the seek by a seek delay determined based on the minimum seek delays, the maximum seek delays, and the allowed seek delay ranges.

8. The method as recited in claim 7, wherein the seek delay comprises a minimum seek delay determined based on the minimum seek delays, the maximum seek delays, and the allowed seek delay ranges.

9. The method as recited in claim 8, wherein for one of the thermal asperities the method further comprises computing the minimum seek delay and the maximum seek delay according to:

$$\begin{cases} t_{min,i} = w_{i1} - w_i, t_{max,i} = Rev + w_{i0} - w_i, \text{ if } w_{i0} \leq w_{i1} \\ t_{min,i} = Rev + w_{i1} - w_i, t_{max,i} = Rev + w_{i0} - w_i, \text{ if } w_{i0} > w_{i1}, w_i > w_{i0} \\ t_{min,i} = w_{i1} - w_i, t_{max,i} = w_{i0} - w_i, \text{ if } w_{i0} > w_{i1}, w_i < w_{i1} \end{cases}$$

where:
i represents an index for the thermal asperity;
$t_{min,i}$ represents the minimum seek delay;
$t_{max,i}$ represents the maximum seek delay;
$w_i$ represents a servo wedge in the thermal asperity where the head will hit the thermal asperity during the undelayed seek;
$w_{i0}$ and $w_{i1}$ represent servo wedges that define a boundary of the thermal asperity; and
Rev represents a total number of servo wedges in the track comprising the thermal asperity.

10. The method as recited in claim 9, wherein for one of the thermal asperities the method further comprises computing the allowed seek delay range according to:

$t_d \in [0, t_{minNot,i}] \cup [t_{maxNot,i}, Rev-1]$ where $$\begin{cases} t_{minNot,i} = w_{i0} - w_i - 1, t_{maxNot,i} = w_{i1} - w_i + 1, \text{ if } w_{i0} \leq w_{i1}, w_i < w_{i0} \\ t_{minNot,i} = Rev + w_{i0} - w_i - 1, t_{maxNot,i} = \\ \quad Rev + w_{i1} - w_i + 1, \text{ if } w_{i0} \leq w_{i1}, w_i > w_{i1} \\ t_{minNot,i} = w_{i0} - w_i - 1, t_{maxNot,i} = Rev + w_{i1} - w_i + 1, \text{ if } w_{i0} > w_{i1} \end{cases}$$

where:
i represents an index for the thermal asperity; and
$t_d$ represents the allowed seek delay range.

11. The method as recited in claim 9, further comprising computing the seek delay by:
for all cases where the head will hit the thermal asperities computing an acceptable delay range according to:

$t_{min} = \max_i t_{min,i} + 1, t_{max} = \min_i t_{max,i} - 1$ if $t_{min} \leq t_{minNot,i}$ for all cases where the head will miss the thermal asperities then setting the seek delay equal to $t_{min}$, otherwise for each case where the head will miss the thermal asperities if $t_{min} > t_{minNot,i}$ then $t_{min} = t_{maxNot,i}$.

12. The method as recited in claim 7, further comprising:
storing a plurality of access commands in a command queue; and
executing a rotational position optimization (RPO) algorithm to determine an execution order for the access commands based on the seek delay determined for at least two of the access commands.

* * * * *